(12) United States Patent
Wu et al.

(10) Patent No.: US 12,087,032 B2
(45) Date of Patent: Sep. 10, 2024

(54) IMAGE ADJUSTMENT APPARATUS, IMAGE ADJUSTMENT METHOD, AND PROGRAM

(71) Applicant: NIPPON TELEGRAPH AND TELEPHONE CORPORATION, Tokyo (JP)

(72) Inventors: Xiaomeng Wu, Musashino (JP); Takahito Kawanishi, Musashino (JP); Kunio Kashino, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 349 days.

(21) Appl. No.: 17/764,599

(22) PCT Filed: Oct. 15, 2019

(86) PCT No.: PCT/JP2019/040436
§ 371 (c)(1),
(2) Date: Mar. 29, 2022

(87) PCT Pub. No.: WO2021/074946
PCT Pub. Date: Apr. 22, 2021

(65) Prior Publication Data
US 2022/0383614 A1    Dec. 1, 2022

(51) Int. Cl.
*G06K 9/00* (2022.01)
*G06T 5/40* (2006.01)
(Continued)

(52) U.S. Cl.
CPC ............... *G06V 10/60* (2022.01); *G06T 5/40* (2013.01); *G06T 5/94* (2024.01); *G06V 10/50* (2022.01); *G06T 2207/10024* (2013.01)

(58) Field of Classification Search
CPC .......... G06V 10/60; G06V 10/50; G06T 5/40; G06T 5/94; G06T 2207/10024;
(Continued)

(56) References Cited

U.S. PATENT DOCUMENTS

2008/0219586 A1* 9/2008 Watanabe ................ H04N 5/20
348/E5.064
2016/0314371 A1* 10/2016 Wang .................... H04N 19/426
2017/0249721 A1* 8/2017 Hirai ......................... G06T 5/73

OTHER PUBLICATIONS

Xiaomeng Wu, Xinhao Liu, Kaoru Hiramatsu, and Kunio Kashino, "Contrast-Accumulated Histogram Equalization for Image Enhancement", 2017 IEEE International Conference on Image Processing (ICIP), 2017.
(Continued)

*Primary Examiner* — Andrew M Moyer
(74) *Attorney, Agent, or Firm* — Harness, Dickey & Pierce, P.L.C.

(57) ABSTRACT

An image adjustment device includes: an illumination component derivation unit that derives an illumination component of a grayscale image; a reflectance component derivation unit that derives a reflectance component image that is a resulting image in which the illumination component is removed from the grayscale image; a contrast component derivation unit that derives a contrast component based on a contrast value between a pixel of the reflectance component image and a peripheral area of the pixel; a histogram derivation unit that derives a luminance histogram of the grayscale image weighted according to the contrast value for each pixel of the contrast component; a conversion function derivation unit that derives a luminance conversion function for converting a luminance such that a luminance histogram of a converted grayscale image in which the grayscale image is converted by the luminance conversion function and a predetermined histogram are matched with or similar to each
(Continued)

other; and a luminance conversion unit that generates the converted grayscale image.

6 Claims, 13 Drawing Sheets

(51) Int. Cl.
    *G06T 5/94*     (2024.01)
    *G06V 10/50*     (2022.01)
    *G06V 10/60*     (2022.01)

(58) Field of Classification Search
CPC . G06T 5/92; G06T 5/20; H04N 1/407; H04N 5/66; H04N 9/12
See application file for complete search history.

(56) References Cited

OTHER PUBLICATIONS

Xiaojie Guo, Yu Li, and Haibin Ling, "LIME: Low-Light Image Enhancement via Illumination Map Estimation", IEEE Transactions On Image Processing, vol. 26, No. 2, Feb. 2017.

Shuhang Wang and Gang Luo, "Naturalness Preserved Image Enhancement Using a Priori Multi-Layer Lightness Statistics", IEEE Transactions On Image Processing, vol. 27, No. 2, Feb. 2018.

* cited by examiner

IMAGE ADJUSTMENT APPARATUS, IMAGE ADJUSTMENT METHOD, AND PROGRAM

CROSS-REFERENCE TO RELATED APPLICATIONS

This application is a 371 U.S. National Phase of International Application No. PCT/JP2019/040436 filed on Oct. 15, 2019. The entire disclosure of the above application is incorporated herein by reference.

TECHNICAL FIELD

The present invention relates to an image adjustment device, an image adjustment method, and a program.

BACKGROUND ART

As an effective way to reveal hidden details in an image, there is known a method of enhancing the contrast. Although various types of image editing software are available on the market, they require expertise in image adjustment and a lot of manual work, and accordingly, it is necessary to implement automatic, image enhancement for various types of input images.

Methods of automatically enhancing an image can be roughly classified into two methods, model-based and learning-based. Model-based methods are attracting more attention than learning-based methods because they do not rely on labeled training data.

In image enhancement processing, histogram equalization has attracted the most attention due to its intuitive implementation quality and high efficiency, while it has a problem of low power of discriminating enhanced contrast.

This occurs because a contrast component is extremely enhanced in an area with many pixels in an image, such as a background without texture, even if the area is not visually important (meaningless area).

In order to deal with such a problem, there is a method of incorporating the spatial information of an image into processing for equalizing the luminance histogram. For example, according to NPD 1, in order to avoid that background noise are extremely enhanced in an input image, luminance gradients are calculated as local luminance contrast values, and a histogram weighted by the contrast values is reconstructed and then equalized. However, in an image in which illumination components are non-uniform, the spatial information of the image exhibits a small value. Therefore, in the method disclosed in NPD 1, there is a problem that it is not effective to enhance the contrast of an image including too dark areas or too bright areas, which has non-uniform illumination components.

Further, as described in NPD 2, there is proposed a method in which a natural image is regarded as a combination of an illumination component image and a reflectance component image, and an enhanced image is obtained by estimating and removing the illumination components that provide global contrast. However, there is a problem that the brightness is extremely enhanced because the global contrast is completely eliminated.

Further, NPD 3 proposes a method of enhancing the illumination components estimated through a bright-pass filter by histogram equalization and recombining the resulting illumination components with the reflectance components. However, there is a problem that the histogram equalization results in extremely suppressed contrast in an area with few pixels in an image even if the area is visually important (meaningful area).

CITATION LIST

Non Patent Document

[NPD 1] Xiaomeng Wu, Xinhao Liu, Kaoru Hiramatsu, and Kunio Kashino, "CONTRAST-ACCUMULATED HISTOGRAM EQUALIZATION FOR IMAGE ENHANCEMENT," 2017 IEEE International Conference on Image Processing (ICIP).

[NPD 2] Xiaojie Guo, Yu Li, and Haibin Ling, "LIME: Low-Light Image Enhancement via Illumination Map Estimation," IEEE TRANSACTIONS ON IMAGE PROCESSING, VOL. 26, NO. 2, February 2017.

[NPD 3] Shuhang Wang and Gang Luo, "Naturalness Preserved Image Enhancement Using a Priori Multi-Layer Lightness Statistics," IEEE TRANSACTIONS ON IMAGE PROCESSING, VOL. 27, NO. 2, February 2018.

SUMMARY OF THE INVENTION

Technical Problem

As described above, in the histogram equalization, the contrast may be extremely enhanced in an area with many pixels in an image even if the area is not visually important. On the other hand, the method of Non Patent Document (NPD) 1 which is to improve such a problem may underestimate the value of the spatial information of an image including too dark areas or the too bright areas; the method of NPD 2 may extremely enhance the brightness because the global contrast component is completely eliminated; and the method of NPD 3 may extremely suppress the contrast in an area with few pixels.

In view of the above circumstances, an object of the present invention is to provide an adjustment device, an image adjustment method, and a program which make it possible to automatically and adaptively enhance the contrast of a visually important area in an image without extremely enhancing the contrast and brightness in the image.

Means for Solving the Problem

One aspect of the present invention is an image adjustment device including: an illumination component derivation unit that derives an illumination component of a grayscale image; a reflectance component derivation unit that derives a reflectance component image that is a resulting image in which the illumination component is removed from the grayscale image; a contrast component derivation unit that derives a contrast component based on a contrast value between a pixel of the reflectance component image and a peripheral area of the pixel; a histogram derivation unit that derives a luminance histogram of the grayscale image weighted according to the contrast value for each pixel of the contrast component; a conversion function derivation unit that derives a luminance conversion function for converting a luminance such that a luminance histogram of a converted grayscale image in which the grayscale image is converted by the luminance conversion function and a predetermined histogram are matched with or similar to each other; and a luminance conversion unit that generates the converted grayscale image.

Effects of the Invention

According to the present invention, it is possible to automatically and adaptively enhance the contrast of a visually important area in an image without extremely enhancing the contrast and brightness in the image.

DESCRIPTION OF EMBODIMENTS

Figure 1:
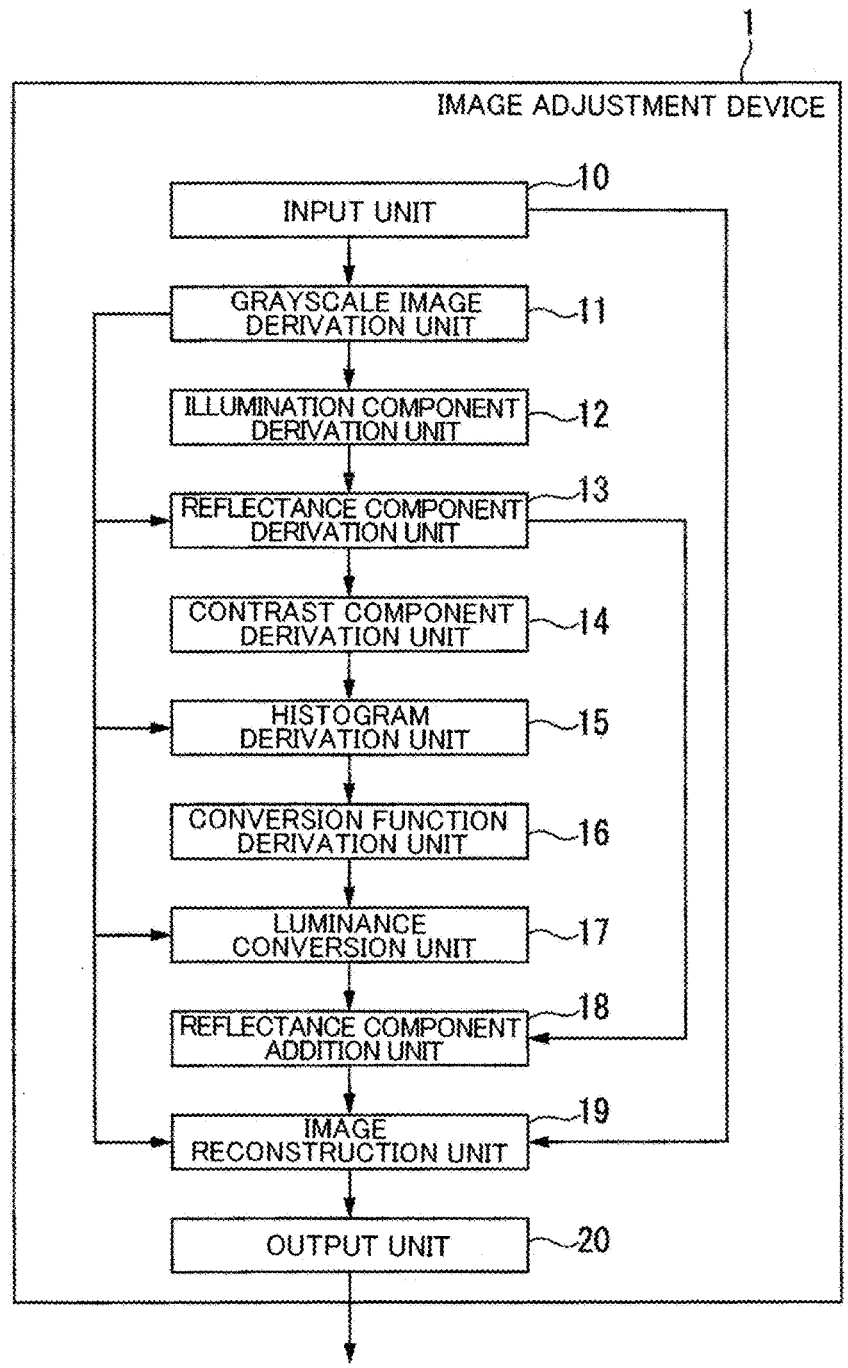
FIG. 1 is a diagram illustrating a structural example of an image adjustment device in an embodiment.
Figure 2:
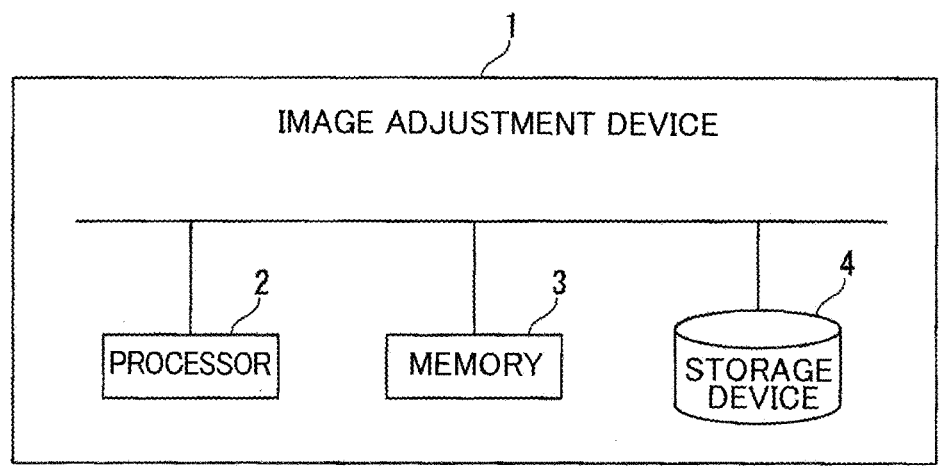
FIG. 2 is a diagram illustrating a hardware configuration example of the image adjustment device in the embodiment.

Embodiments of the present invention will be described in detail with reference to the drawings.
FIG. 1 is a diagram illustrating a configuration example of an image adjustment device 1. The image adjustment device 1 (image adjustment apparatus) is a device for adjusting an image. For example, the image adjustment device 1 enhances the contrast of an image. The image adjustment device 1 may adjust the brightness of an image. For example, the image adjustment device 1 adjusts the contrast and brightness of areas that are visually important in an image and does not adjust the contrast and brightness of areas that are not visually important in the image so much.
The image adjustment device 1 includes an input unit 10, a grayscale image derivation unit (grayscale image derivator) 11, an illumination component derivation unit (Illumination component derivator) 12, a reflectance component derivation unit (reflectance component derivator) 13, a contrast component derivation unit (contrast component derivator) 14, a histogram derivation unit (histogram derivator) 15, a conversion function derivation unit (conversion function derivator) 16, a luminance conversion unit (the luminance converter) 17, a reflectance component addition unit (reflectance component adder) 18, an image reconstruction unit (image reconstructor) 19, and an output unit 20. Note that the image adjustment device 1 does not have to include the reflectance component addition unit 18.
FIG. 2 is a diagram illustrating a hardware configuration example of the image adjustment device 1. The image adjustment device 1 includes a processor 2, a memory 3, and a storage device 4.
Part or all of the respective functional units of the image adjustment device 1 are implemented as software by the processor 2 such as a CPU (Central Processing Unit) executing a program loaded into the memory 3 from the storage device 4 which is a non-volatile storage medium (non-transitory storage medium). The program may be recorded on a computer-readable storage medium. The computer-readable storage medium is a non-transitory storage medium, including a portable medium, such as a flexible disk, magneto optical disk, ROM (Read Only Memory), and CD-ROM (Compact Disc Read Only Memory), and a storage device, such as a hard disk built in a computer system, for example. The program may be received via a telecommunication line.
Part or all of the respective functional units of the image adjustment device 1 may be implemented using hardware including, for example, an electronic circuit or circuitry using an LSI (Large Scale Integration circuit), ASIC (Application Specific Integrated Circuit), PLD (Programmable Logic Device), or FPGA (Field Programmable Gate Array).
Returning to FIG. 1, the outline of the image adjustment device 1 will be described.
The input unit 10 acquires a color image or a grayscale image as an input image "$C_{in}$". The grayscale image is an image representing the value or luminance of the pixels of the input image. The input unit 10 outputs the input image to the grayscale image derivation unit 11 and the image reconstruction unit 19. In the following, matrix operations are performed element by element.
For the input image being a color image, the grayscale image derivation unit 11 derives a grayscale image from the color image. The grayscale image derivation unit 11 may acquire a grayscale image from the input unit 10 instead of deriving the grayscale image. The grayscale image derivation unit 11 outputs the grayscale image to the illumination component derivation unit 12, the reflectance component derivation unit 13, the histogram derivation unit 15, the luminance conversion unit 17, and the image reconstruction unit 19.
The illumination component derivation unit 12 equalizes the grayscale image. The illumination component derivation unit 12 generates the resulting image in which the grayscale image is equalized as an illumination component image. The illumination component image is an image representing the illumination component of the grayscale image. The illumination component derivation unit 12 outputs the illumination component image to the reflectance component derivation unit 13.
The reflectance component derivation unit 13 acquires the illumination component image from the illumination component derivation unit 12. The reflectance component derivation unit 13 acquires the grayscale image from the grayscale image derivation unit 11. The reflectance component derivation unit 13 generates the resulting image in which the illumination component of the illumination component image is removed from the grayscale image as a reflectance component image. The reflectance component derivation unit 13 outputs the reflectance component image to the contrast component derivation unit 14 and the reflectance component addition unit 18.

The contrast component derivation unit 14 derives, for each pixel of the reflectance component image, the value of a local gradient of the reflectance component in the reflectance component image as a weight coefficient. In other words, the contrast component derivation unit 14 derives, for each pixel of the reflectance component image, a contrast value between the pixel in the reflectance component image and a periphery of the pixel as a weight coefficient.

The contrast component derivation unit 14 generates an image having pixel values each of which is the contrast value between a pixel in the reflectance component image and a periphery of the pixel (hereinafter, referred to as "contrast component"). The contrast component derivation unit 14 outputs the contrast component to the histogram derivation unit 15.

The histogram derivation unit 15 acquires the contrast component from the contrast component derivation unit 14. The histogram derivation unit 15 acquires the grayscale image from the grayscale image derivation unit 11. The histogram derivation unit 15 derives a luminance histogram of the grayscale image weighted according to the contrast value for each pixel of the contrast component. The histogram derivation unit 15 outputs the luminance histogram to the conversion function derivation unit 16.

The conversion function derivation unit 16 acquires the luminance histogram from the histogram derivation unit 15. The conversion function derivation unit 16 acquires a predetermined histogram from the memory 3. The predetermined histogram is a histogram determined in advance according to the specification of enhancement, and is, for example, a histogram of uniformly distributed luminance. The distribution of the predetermined histogram may be any probability distribution. For example, the distribution of the predetermined histogram may be a probability distribution given in the form of a logarithmic or linear function.

The conversion function derivation unit 16 derives a luminance conversion function such that the luminance histogram of a grayscale image with converted luminance (hereinafter referred to as "converted grayscale image") and the predetermined histogram are matched with or similar to each other. As a result, the predetermined histogram and the luminance histogram of the converted grayscale image output from the luminance conversion unit 17 are matched with or similar to each other. The conversion function derivation unit 16 outputs the luminance conversion function to the luminance conversion unit 17.

The luminance conversion unit 17 acquires the luminance conversion function from the conversion function derivation unit 16. The luminance conversion unit 17 acquires the grayscale image from the grayscale image derivation unit 11. The luminance conversion unit 17 converts the luminance of the grayscale image by applying the luminance conversion function to the luminance of each pixel of the grayscale image. In other words, the luminance conversion unit 17 generates a result of applying the luminance conversion function to the luminance of each pixel of the grayscale image as a converted grayscale image. The luminance conversion unit 17 outputs the converted grayscale image to the reflectance component addition unit 18.

The reflectance component addition unit 18 acquires the converted grayscale image from the luminance conversion unit 17. The reflectance component addition unit 18 acquires the reflectance component image from the reflectance component derivation unit 13. The reflectance component addition unit 18 adds the reflectance component of the reflectance component image to the converted grayscale image to generate a grayscale image with further enhanced contrast (hereinafter referred to as "enhanced grayscale image"). The reflectance component addition unit 18 generates the enhanced grayscale image by synthesizing the converted grayscale image and the reflectance component image. The reflectance component addition unit 18 outputs the enhanced grayscale image to the image reconstruction unit 19.

The image reconstruction unit 19 acquires the enhanced grayscale image from the reflectance component addition unit 18. The image reconstruction unit 19 acquires the input image from the input unit 10. The image reconstruction unit 19 acquires the grayscale image from the grayscale image derivation unit 11. The image reconstruction unit 19 reconstructs, from the enhanced grayscale image, the color information of the input image, and the grayscale image, an input image with enhanced contrast (hereinafter, referred to as "enhanced input image"). The image reconstruction unit 19 outputs the enhanced input image to the output unit 20. The output unit 20 outputs the enhanced input image to a predetermined external device (not illustrated).

Next, the details of the image adjustment device 1 will be described.

When the grayscale image derivation unit 11 acquires a color image as the input image from the input unit 10, the grayscale image derivation unit 11 derives the grayscale image of the input image from the input image. When the grayscale image derivation unit 11 acquires a grayscale image as the input image from the input unit 10, the grayscale image derivation unit 11 outputs the grayscale image thus input as it is to the illumination component derivation unit 12, the reflectance component derivation unit 13, the histogram derivation unit 15, the luminance conversion unit 17, and the image reconstruction unit 19.

The following is a case where the grayscale image derivation unit 11 acquires a color image as an input image from the input unit 10. The grayscale image derivation unit 11 derives a grayscale image as an image representing the maximum value in the color components of the RGB (Red, Green, Blue) component for each pixel of the input image. The maximum value in the RGB component is the same as the value component (V component) of the input image of the HSV color space (color space of hue, saturation, and value/brightness). The grayscale image derivation unit 11 may derive a grayscale image as an image representing the RGB component for each pixel of the input image.

The grayscale image derivation unit 11 may derive a grayscale image as an image representing the I component (luminance component) of the HSI (hue, saturation, intensity representing the average value of RGB component) color space for each pixel. The grayscale image derivation unit 11 may derive a grayscale image as an image representing the L component (lightness component) of the HSL (hue, saturation, lightness representing the average value of the maximum and minimum values of RGB component) color space for each pixel. The grayscale image derivation unit 11 may derive a grayscale image as an image representing the Y component (luminance component) of the XYZ color space or YUV (luminance, blue-luminance difference, and red-luminance difference) color space for each pixel. The grayscale image derivation unit 11 may derive a grayscale image as an image representing the L component (lightness component) of the LUV color space or the Lab color space for each pixel.

The illumination component derivation unit 12 equalizes the grayscale image to generate the resulting image in which the grayscale image is equalized as an illumination component image. The method by which the illumination component derivation unit 12 equalizes the grayscale image is not limited to a specific equalization method.

For example, the illumination component derivation unit 12 may generate as an illumination component image the resulting image in which the grayscale image is equalized by a median filter, a bilateral filter, a guided filter, or an anisotropic diffusion filter. In the following, as an example, the illumination component derivation unit 12 generates as an illumination component image the resulting image in which the grayscale image is equalized by edge-preserving smoothing. In edge-preserving smoothing, for each pixel, the ratio of the average of the absolute values of the first-order derivatives of luminance to the absolute of the average of the first-order derivatives of luminance in a local area around the pixel is measured as a score indicating the strength of the texture. When the grayscale image is input to the illumination component derivation unit 12, an output image (the resulting image in which the grayscale image is equalized) is optimized so that the total strength of the texture of the output image is minimized. In the resulting image in which the grayscale image is equalized by edge-preserving smoothing, the halo effect is unlikely to occur in the reflectance component of the grayscale image.

The reflectance component derivation unit 13 derives a result of removing the illumination component from the grayscale image as a reflectance component image. The reflectance component is expressed by Equation (1).

[Formula 1]

$$R = \log_{10}\left(\frac{A_{in}}{I}\right) \quad (1)$$

Here, "$A_{in}$" represents a grayscale image. "I" represents the illumination component of the grayscale image. "R" represents the reflectance component of the grayscale image. According to the Retinex theory, a natural image is a combination of an illumination component image and a reflectance component image. The illumination component represents the global contrast within the grayscale image of the natural image. The reflectance component represents the details in an area within the grayscale image of the natural image.

In Equation (1), the reflectance component is derived by using a logarithmic function. By using the logarithmic function, the difference in the reflectance component in a dark area in an image becomes large. By using the logarithmic function, the difference in the reflectance component in a bright area in the image becomes small. In natural images, bright areas such as light sources and the sky are usually less visually important. On the other hand, when an image is captured under poor illumination conditions such as backlight, low key illumination, and underexposure, it is more difficult to enhance important image details hidden in dark areas. Therefore, the use of a logarithmic function as in Equation (1) is effective for deriving the reflectance component. Note that, although a common logarithm is used in Equation (1), a logarithm having any real number larger than 1 as the base may be used.

As long as the illumination component is removed from the grayscale image, the method for deriving the reflectance component image is not limited to a specific deriving method. For example, the reflectance component derivation unit 13 may derive a result of dividing each pixel value of the grayscale image by each pixel value of the illumination component as a reflectance component image. Further, for example, the reflectance component derivation unit 13 may derive a result of subtracting the illumination component from the grayscale image as a reflectance component image.

The contrast component derivation unit 14 derives a contrast value "φ" of the reflectance component between a pixel "q" and a periphery of the pixel for each pixel of the reflectance component image as illustrated in Equation (2).

[Formula 2]

$$\phi(q) = \sum_{q' \in N(q)} |r(q) - r(q')| \quad (2)$$

Here, "N(q)" represents a set of coordinates of pixels adjacent to the pixel "q" in the reflectance component image. For example, "N(q)" is the von Neumann neighborhood, the extended von Neumann neighborhood, or the Moore neighborhood. In the following, the pixel value "{r(q)}" of the pixel "q" in the reflectance component image is expressed as "R".

In the reflectance component image, the images of visually important objects may be different in size from each other. In this respect, the contrast component derivation unit 14 uses a multiresolution method to derive contrast values at different resolutions from each other so that the images of all visually important objects are represented using the contrast values. For example, the contrast component derivation unit 14 generates a plurality of reflectance components "$R_1, R_2, \ldots, R_L$" at different resolutions from each other. "L" is the number of reflectance components to be generated. In the following, "L" is 4 as an example. The resolution of the reflectance component "$R_1(=R)$" is the largest among the resolutions of the plurality of reflectance components. The resolution of the reflectance component "$R_L(=R)$" is the smallest among the resolutions of the plurality of reflectance components.

The contrast component derivation unit 14 derives the reflectance component "$R_2$" by downsampling the reflectance component "$R_1(=R)$" in half using the bicubic interpolation method. The contrast component derivation unit 14 repeats the downsampling (change of resolution) "L−1" times until the reflectance component "$R_L$" is obtained.

The contrast component derivation unit 14 derives the contrast value "φ(q)" as in Equation (2) based on each downsampled reflectance component. The contrast component derivation unit 14 upsamples the contrast values "φ(q)" of all the downsampled reflectance components to the same resolution as the reflectance component "R", and then uses the geometric mean to synthesize the resulting contrast values for each pixel "q". The contrast component derivation unit 14 outputs the contrast component "Φ(q)" (image) synthesized for the pixel "q" to the histogram derivation unit 15.

The method for deriving the contrast value is not limited to a specific deriving method as long as, for each pixel of the reflectance component image, the contrast value between the pixel and the periphery of the pixel is derived.

For example, instead of using a multiresolution method, the contrast component derivation unit 14 may output to the histogram derivation unit 15 a contrast component whose pixel values are contrast values derived only based on the reflectance component "R" based on Equation (2).

For example, instead of using a multiresolution method, the contrast component derivation unit 14 may output to the histogram derivation unit 15 a result of applying an edge detection filter such as a sobel filter to the reflectance component image, as a contrast component whose pixel values are contrast values.

The histogram derivation unit 15 derives a histogram of the luminance of the grayscale image weighted according to the contrast values of the reflectance component image. The luminance histogram of a grayscale image "$A_{in}=\{a(q)\}$" is expressed by Equation (3). Accordingly, the probability of occurrence "$p_a(k)$" of a pixel luminance value "$k \in [0, K)$" in the grayscale image "$A_{in}$" is expressed by Equation (3). Here, "$a(q) \in [0, K)$" represents the luminance of each pixel "q". "K" is the total number of luminance values in the grayscale image. In the following, "K" is 256 as an example.

[Formula 3]

$$p_a(k) = \frac{\sum_q \Phi(q)\delta(a(q), k)}{\sum_q \Phi(q)} \quad (3)$$

Here, "$\Phi(q)$" represents a contrast component synthesized for the pixel "q". "$\delta(\cdot,\cdot)$" is the Kronecker delta.

Equation (3) represents that each pixel of the grayscale image adaptively contributes to the derivation of the histogram. The probability of occurrence "$p_a(k)$" represents an expected value of the contrast component corresponding to the luminance value "k" of a pixel of the grayscale image.

Figure 3:
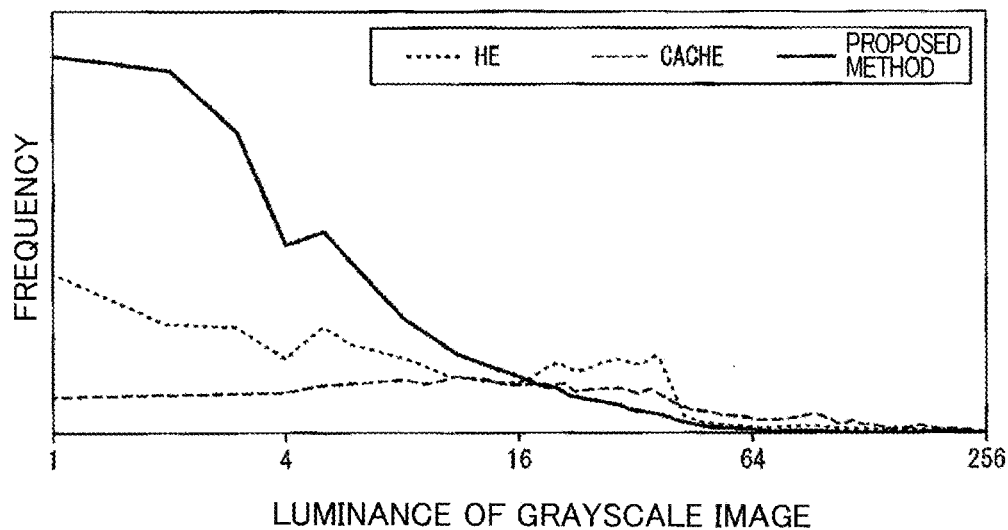
FIG. 3 illustrates an example of a luminance histogram of a grayscale image weighted according to a contrast component in the embodiment.

FIG. 3 illustrates an example of a luminance histogram of a grayscale image weighted according to a contrast component. The line indicated by "HE (histogram equalization)" in FIG. 3 represents a histogram representing the frequency of appearance of the pixel values (luminance) of a grayscale image for each luminance. The line indicated by "CACHE" (Contrast-ACcumulated Histogram Equalization) in FIG. 3 represents a histogram of the luminance of the grayscale image weighted according to the luminance gradients as disclosed in NPD 1. The line indicated by "Proposed method" in FIG. 3 represents a histogram of the luminance of the grayscale image weighted according to the contrast values of the reflectance component image.

The conversion function derivation unit 16 derives a luminance conversion function such that the luminance histogram of the converted grayscale image is matched with or similar to a predetermined histogram. The format of a luminance conversion function "T(k)" is "b(q)=T(a(q))". The conversion function derivation unit 16 derives the luminance conversion function "T(k)" for the luminance conversion unit 17 to generate a converted grayscale image "$B=\{b(q)\}$" as in Equation (4).

[Formula 4]

$$\begin{aligned} T(k) &= \arg \min_T |P_b(T(k)) - P_a(k)| \\ &= P_b^{-1}(P_a(k)) \end{aligned} \quad (4)$$

Here, "$P_a(k)$" represents a cumulative distribution function corresponding to the histogram of the luminance (probability of occurrence) "$p_a(k)$" of the grayscale image "$A_{in}$". "$P_b(k)$" represents a cumulative distribution function corresponding to the histogram of the luminance (probability of occurrence) "$p_b(k)$" of the converted grayscale image "B".

In the following, the predetermined histogram is a histogram of uniformly distributed luminance as an example. The conversion function derivation unit 16 derives a luminance conversion function such that the histogram of uniformly distributed luminance and the luminance histogram of the converted grayscale image are matched with or similar to each other. Specifically, the conversion function derivation unit 16 derives a luminance conversion function such that the histogram of uniformly distributed luminance and the histogram of the luminance (probability of occurrence) "$p_b(k)$" of the converted grayscale image "B" are matched with or similar to each other. The processing for the conversion function derivation unit 16 to derive the luminance conversion function is processing corresponding to equalization of the luminance histogram. Equation (4) is expressed as Equation (5).

[Formula 5]

$$T(k) = (K-1)P_a(k) \quad (5)$$

Figure 4:
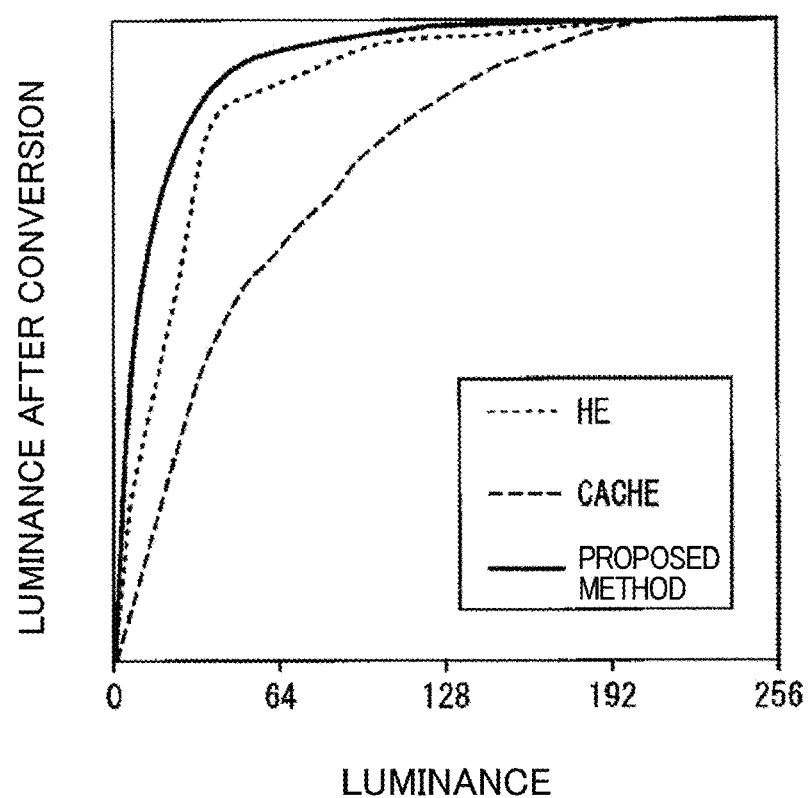
FIG. 4 illustrates an example of a luminance conversion function in the embodiment.

FIG. 4 is a diagram illustrating an example of a luminance conversion function for equalizing the luminance histogram illustrated in FIG. 3. The horizontal axis represents the luminance (input luminance) of a non-equalized histogram. The vertical axis represents the luminance (output luminance) of an equalized histogram. An increase of the output luminance with respect to the input luminance is proportional to the expected value "$p_a(k)$" of the contrast component corresponding to the luminance value "k" of a pixel of the grayscale image.

The luminance conversion unit 17 derives the luminance of each pixel of the converted grayscale images "$B=\{b(q)\}$" based on the luminance conversion functions "T(k)" and "b(q)=T(a(q))". The luminance conversion unit 17 outputs to the reflectance component addition unit 18 a result of applying the luminance conversion function to the luminance of each pixel of the grayscale image, as the converted grayscale image "$B=\{b(q)\}$".

The reflectance component addition unit 18 generates an enhanced grayscale image "$A_{out}$" by adding the reflectance component to the converted grayscale image "$B=\{b(q)\}$". The local contrast inherited from the grayscale image "Ai," is already included in the converted grayscale image "B". Accordingly, the details of the grayscale image are enhanced by adding the reflectance component to the converted grayscale image even when the reflectance component is maintained or reduced.

The enhanced grayscale image output from the reflectance component addition unit 18 is represented as "$A_{out}=B+eR$". Here, "e" is a hyperparameter. The hyperparameter "e" is any real number, for example, a real number selected from a range of [0, 1]. In the following, "e" is 0.5 as an example.

The image reconstruction unit 19 reconstructs an enhanced input image (color image with enhanced contrast) by using the input image, the grayscale image, and the enhanced grayscale image "$A_{out}$". Accordingly, the enhanced input image "$C_{out}$" is a color image (enhanced color image) into which the enhanced grayscale image "$A_{out}$" has been converted based on the input image and the grayscale image. The enhanced input image "$C_{out}$" is represented by Equation (6).

[Formula 6]

$$C_{out} = \left(\frac{C_{in}}{A_{in}}\right)^\alpha A_{out}. \quad (6)$$

Here, "α" is a hyperparameter. The hyperparameter "α" is 1 or a real number close to 1. In the following, "α" is 1 as an example.

Even in a case where the grayscale image derivation unit 11 derives a grayscale image by using the I component of the HSI color space or the L component of the HSL color space instead of the grayscale image derivation unit 11 deriving a grayscale image by using the V component of the HSV color space, the image reconstruction unit 19 generates an enhanced input image by using Equation (6).

In a case where the grayscale image derivation unit 11 derives a grayscale image by using the Y component of the XYZ color space or the YUV color space, the image reconstruction unit 19 may acquire the grayscale image from the grayscale image derivation unit 11. The image reconstruction unit 19 may replace the Y component in the enhanced input image with an enhanced grayscale image.

In a case where the grayscale image derivation unit 11 derives a grayscale image by using the L component of the LUV color space or the LAB color space, the image reconstruction unit 19 may acquire the grayscale image from the grayscale image derivation unit 11. The image reconstruction unit 19 may replace the L component in the enhanced input image with an enhanced grayscale image.

In a case where the grayscale image derivation unit 11 derives three grayscale images by using the respective color components of the RGB components of the input image, the image reconstruction unit 19 may generate an enhanced input image by synthesizing the three grayscale images.

Next, an operation example of the image adjustment device 1 will be described.

Figure 5:
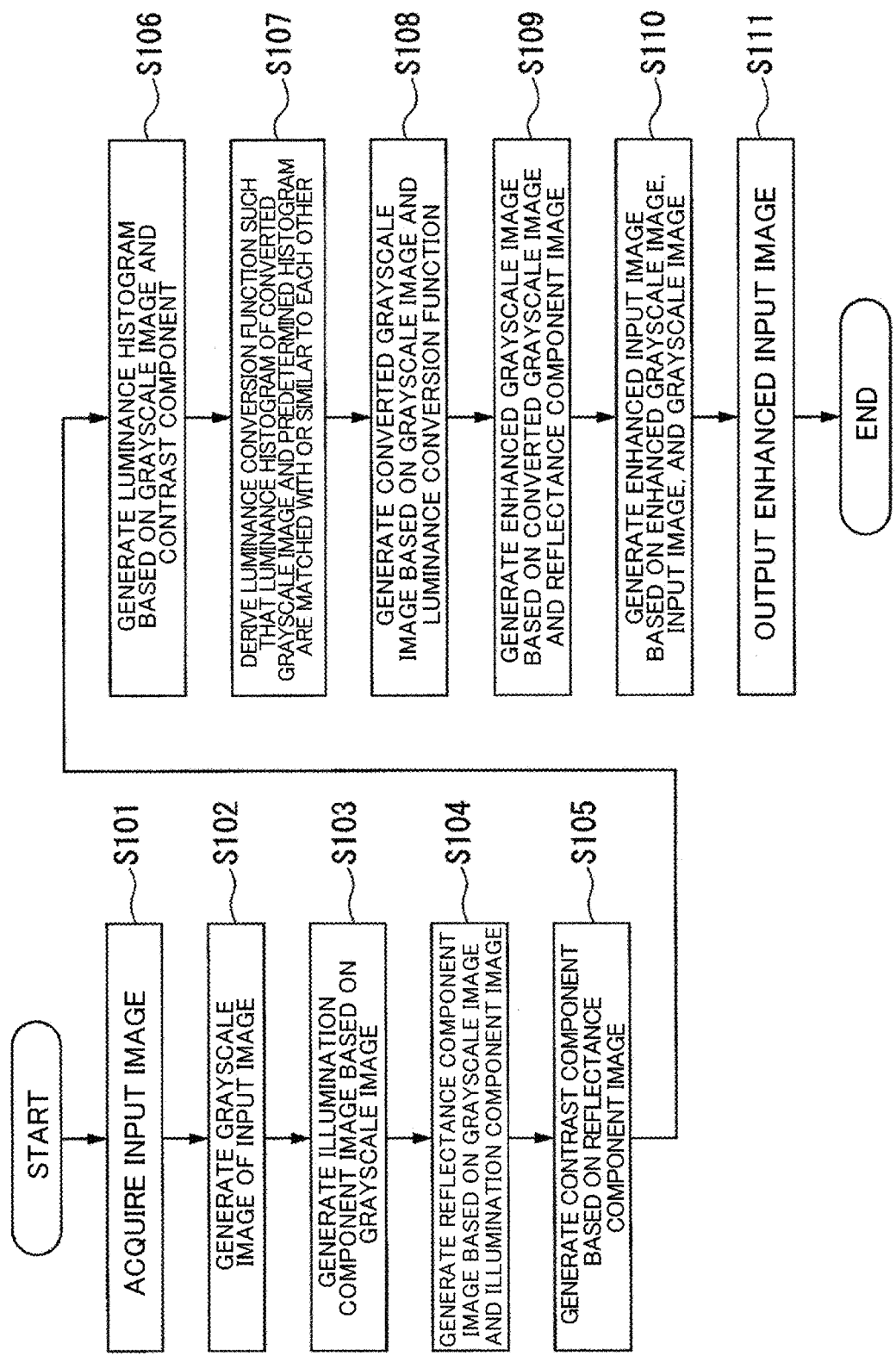
FIG. 5 is a flowchart illustrating an operation example of the image adjustment device in the embodiment.

FIG. 5 is a flowchart illustrating the operation example of the image adjustment device 1. The grayscale image derivation unit 11 acquires the input image from the input unit 10 (step S101). The grayscale image derivation unit 11 generates a grayscale image of the input image (step S102). The illumination component derivation unit 12 generates an illumination component image based on the grayscale image (step S103). The reflectance component derivation unit 13 generates a reflectance component image based on the grayscale image and the illumination component image (step S104).

The contrast component derivation unit 14 generates a contrast component based on the reflectance component image (step S105). The histogram derivation unit 15 derives a luminance histogram based on the grayscale image and the contrast component (step S106). The conversion function derivation unit 16 derives a luminance conversion function such that the luminance histogram of the converted grayscale image and a predetermined histogram are matched with or similar to each other (step S107).

The luminance conversion unit 17 generates a converted grayscale image based on the grayscale image and the luminance conversion function (step S108). The reflectance component addition unit 18 generates an enhanced grayscale image based on the converted grayscale image and the reflectance component image (step S109). The image reconstruction unit 19 generates an enhanced input image based on the enhanced grayscale image, the input image, and the grayscale image (step S110). The output unit 20 outputs the enhanced input image to a predetermined external device (step S111).

As described above, the image adjustment device 1 of the embodiment includes the illumination component derivation unit 12, the reflectance component derivation unit 13, the contrast component derivation unit 14, the histogram derivation unit 15, the conversion function derivation unit 16, and the luminance conversion unit 17. The illumination component derivation unit 12 derives an illumination component of a grayscale image. The reflectance component derivation unit 13 derives a reflectance component image which is a resulting image in which the illumination component is removed from the grayscale image. The contrast component derivation unit 14 derives a contrast component based on a contrast value between a pixel of the reflectance component image and a peripheral area of the pixel. The histogram derivation unit 15 derives a luminance histogram of the grayscale image weighted according to the contrast value for each pixel of the contrast component. The conversion function derivation unit 16 derives a luminance conversion function such that the luminance histogram of the converted grayscale image and a predetermined histogram are matched with or similar to each other. The luminance conversion unit 17 generates a converted grayscale image by using the luminance conversion function. The image adjustment device 1 of the embodiment may include the reflectance component addition unit 18 and the image reconstruction unit 19. The reflectance component addition unit 18 may generate an enhanced grayscale image which is a resulting image in which the converted grayscale image and the reflectance component image are synthesized. The image reconstruction unit 19 converts the enhanced input image into an image having color information based on the color image (input image) and the grayscale image.

In this way, the image adjustment device 1 removes the illumination component from the input image (grayscale image) before deriving local luminance gradients, so that contrast values in local dark areas can be accurately derived. This makes it possible to enhance, according to the input image (grayscale image), the contrast of visually important areas in the image without extremely enhancing the contrast and brightness in the image.

In other words, the image adjustment device 1 removes the illumination component from the input image before deriving local contrast values in the input image. As a result of removing the illumination component from the input image, the reflectance component of the input image remains. This reflectance component does not contain any illumination component, and therefore is completely unaffected by illumination appearing in the captured input image. As a result, the image adjustment device 1 can accurately derive local contrast values in dark area of the input image (grayscale image).

Figure 6:
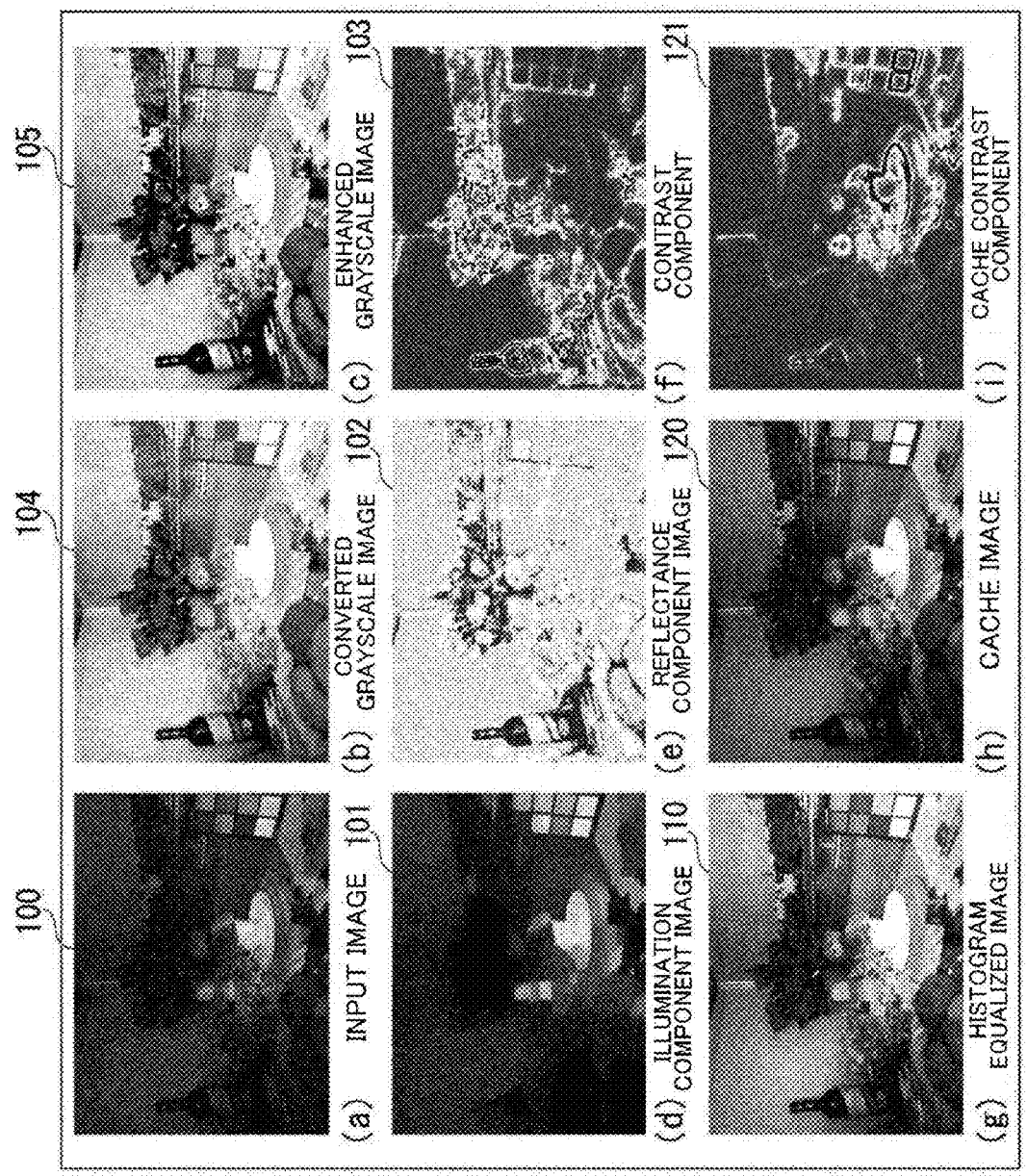
FIG. 6 illustrates an example of images in the embodiment.
Figure 7:
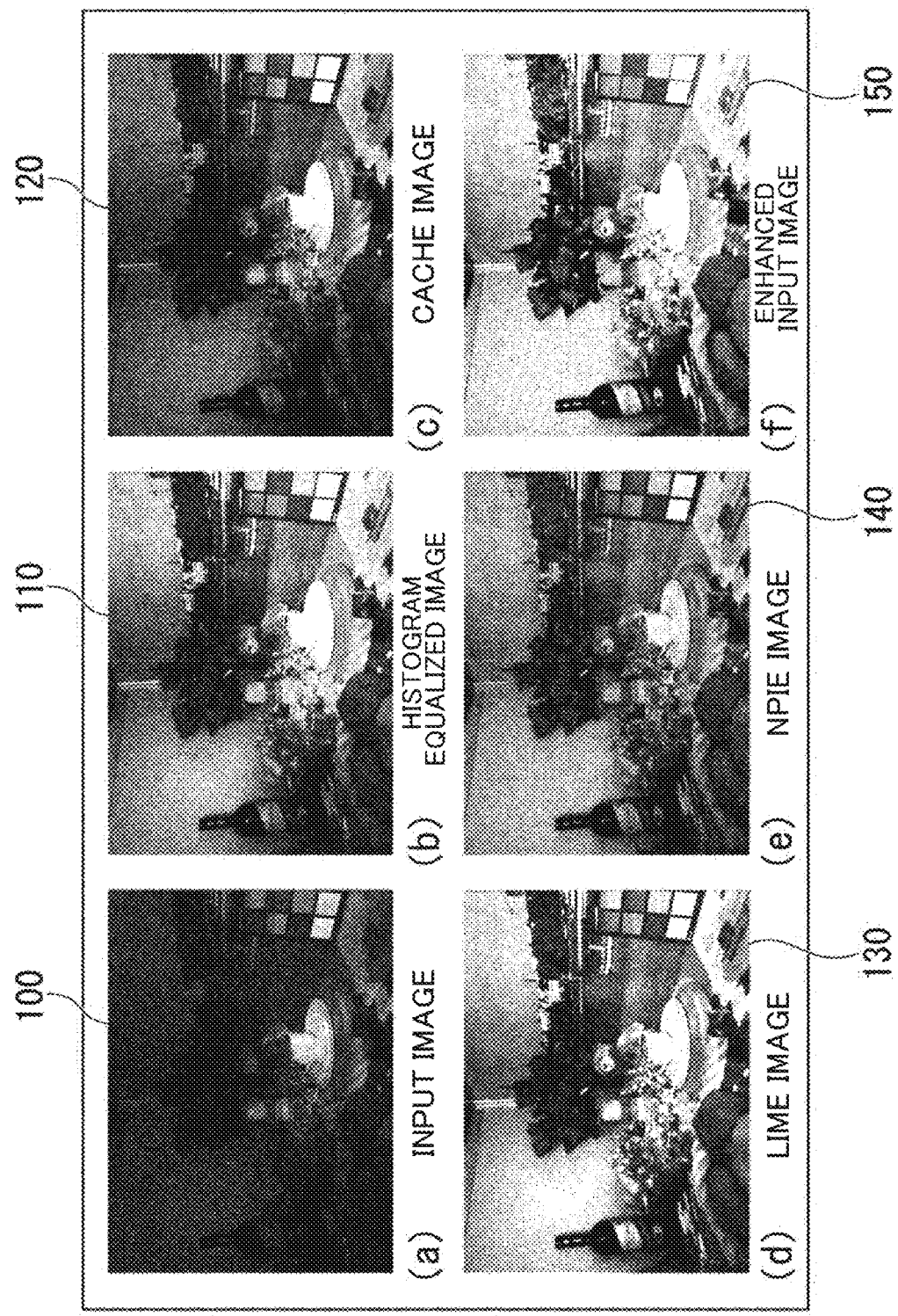
FIG. 7 illustrates a first example of a set of an enhanced input image and images obtained by other methods in the embodiment.
Figure 8:
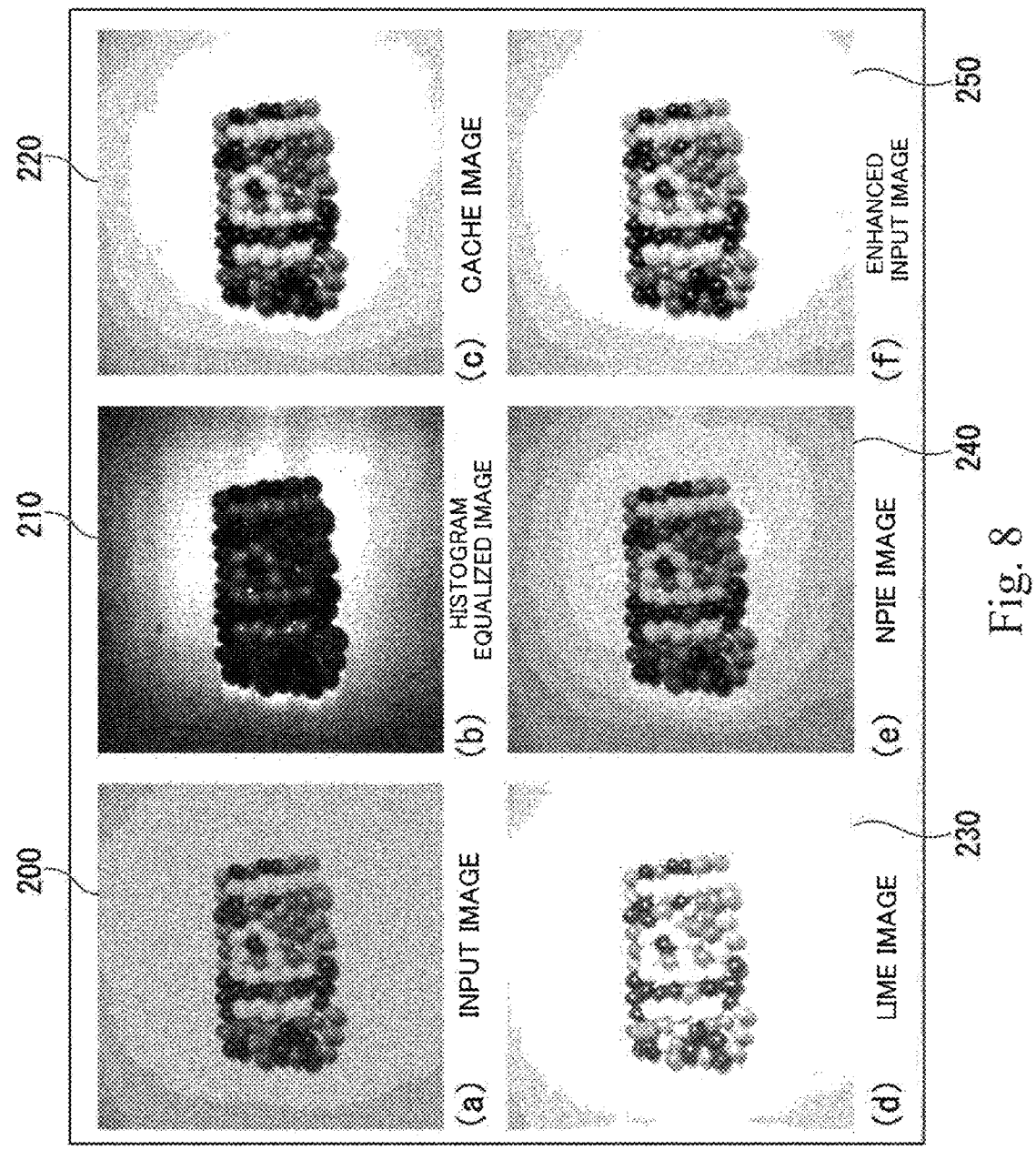
FIG. 8 illustrates a second example of a set of an enhanced input image and images obtained by other methods in the embodiment.
Figure 9:
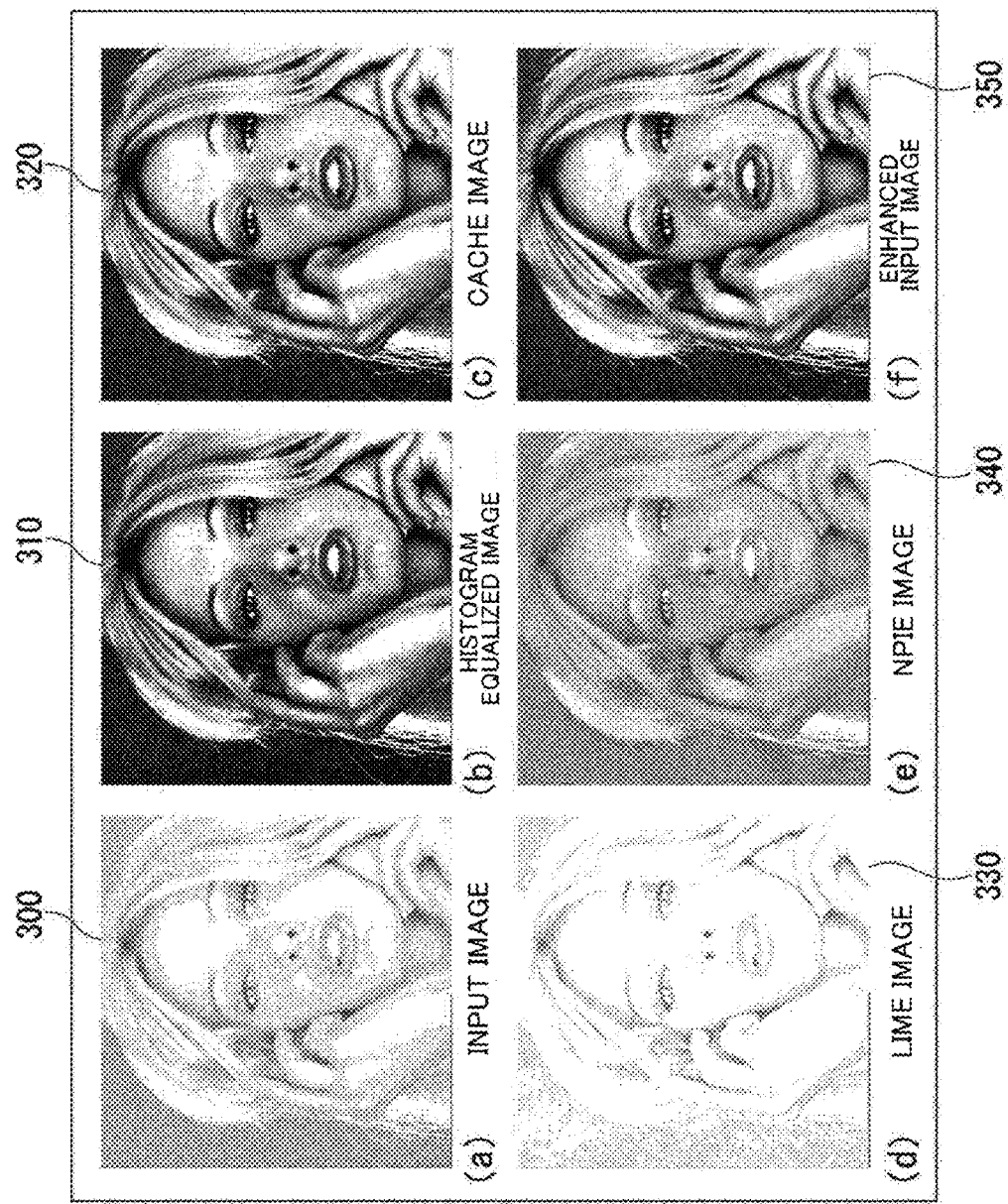
FIG. 9 illustrates a third example of a set of an enhanced input image and images obtained by other methods in the embodiment.
Figure 10:
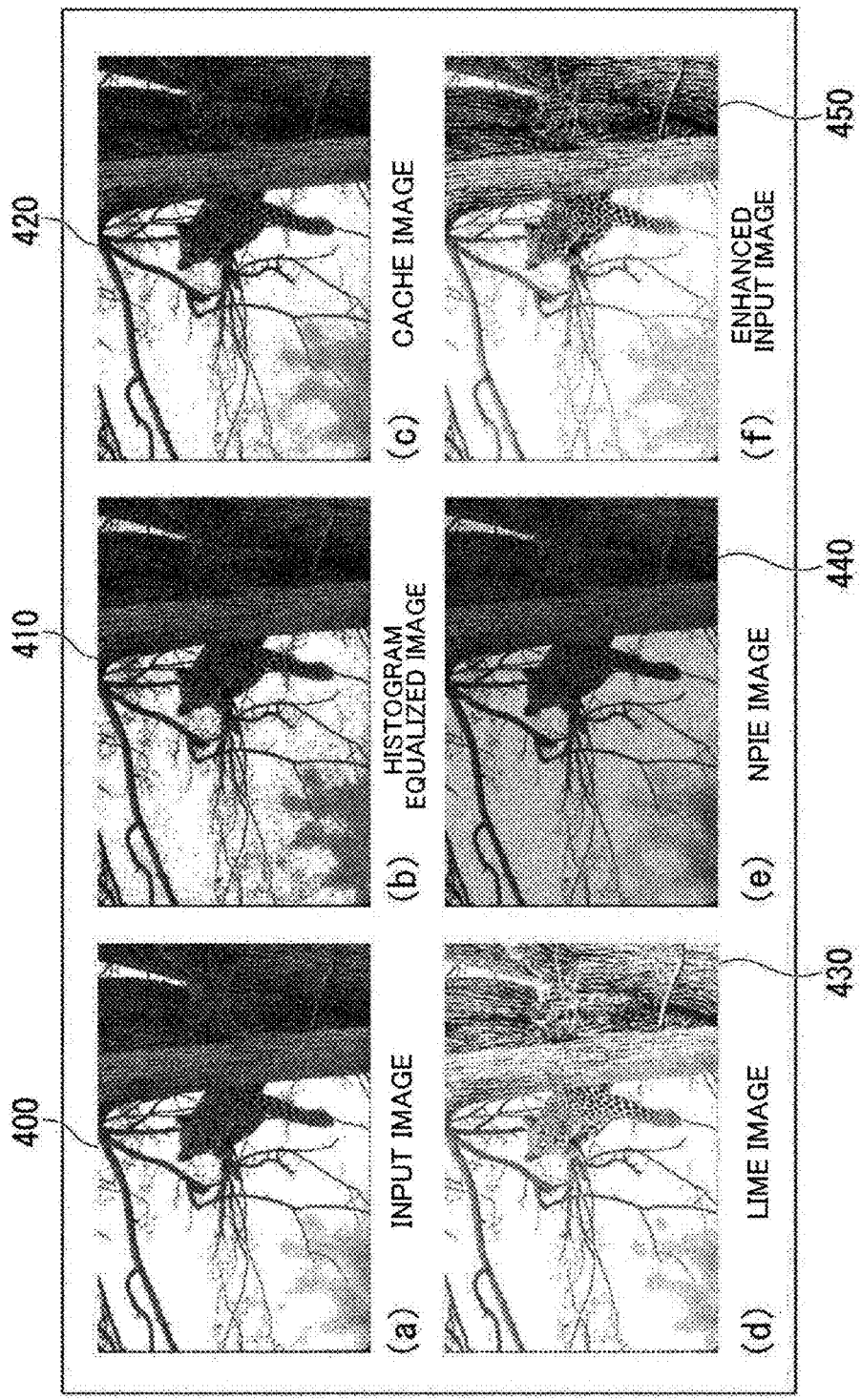
FIG. 10 illustrates a fourth example of a set of an enhanced input image and images obtained by other methods in the embodiment.
Figure 11:
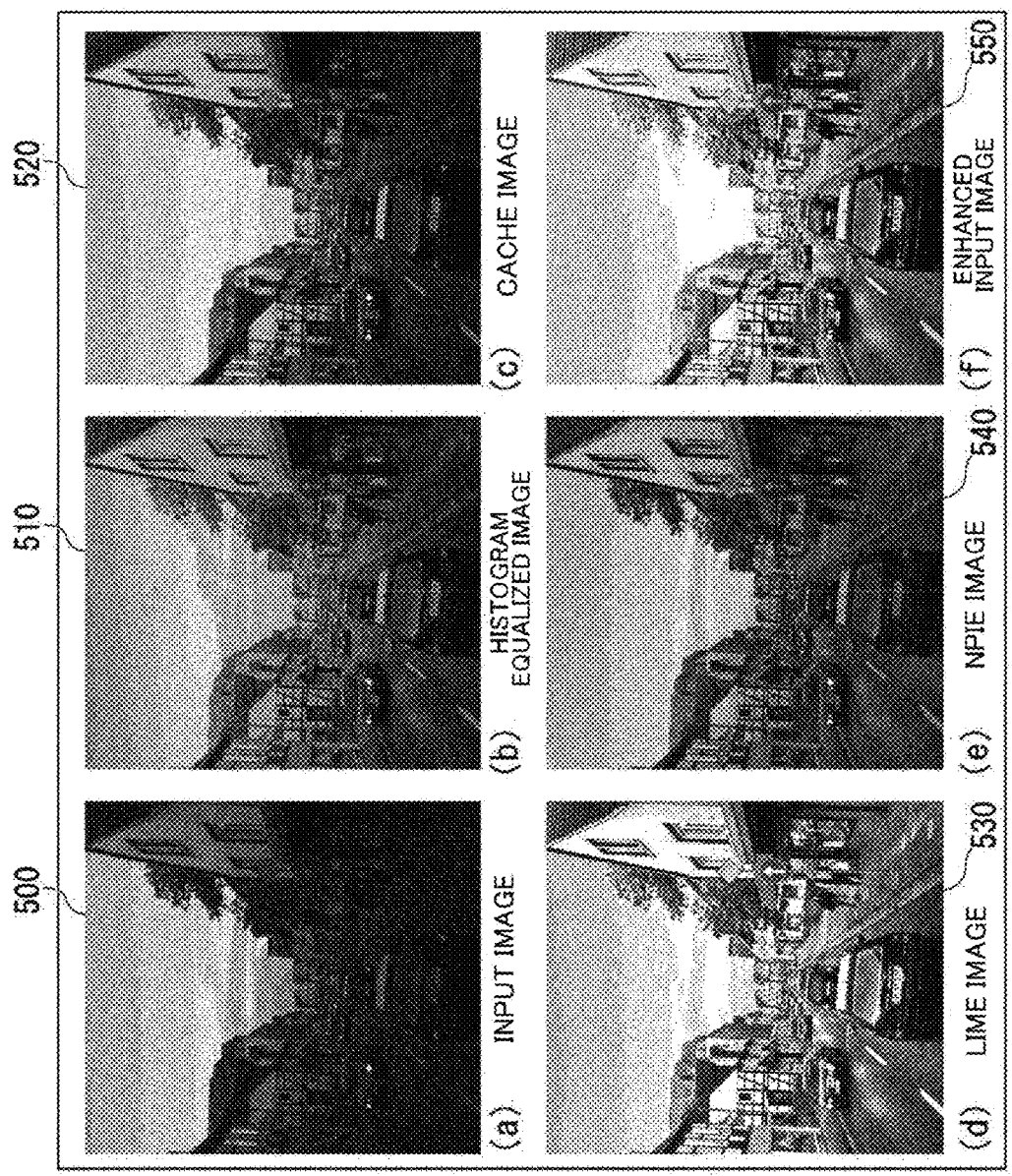
FIG. 11 illustrates a fifth example of a set of an enhanced input image and images obtained by other methods in the embodiment.
Figure 12:
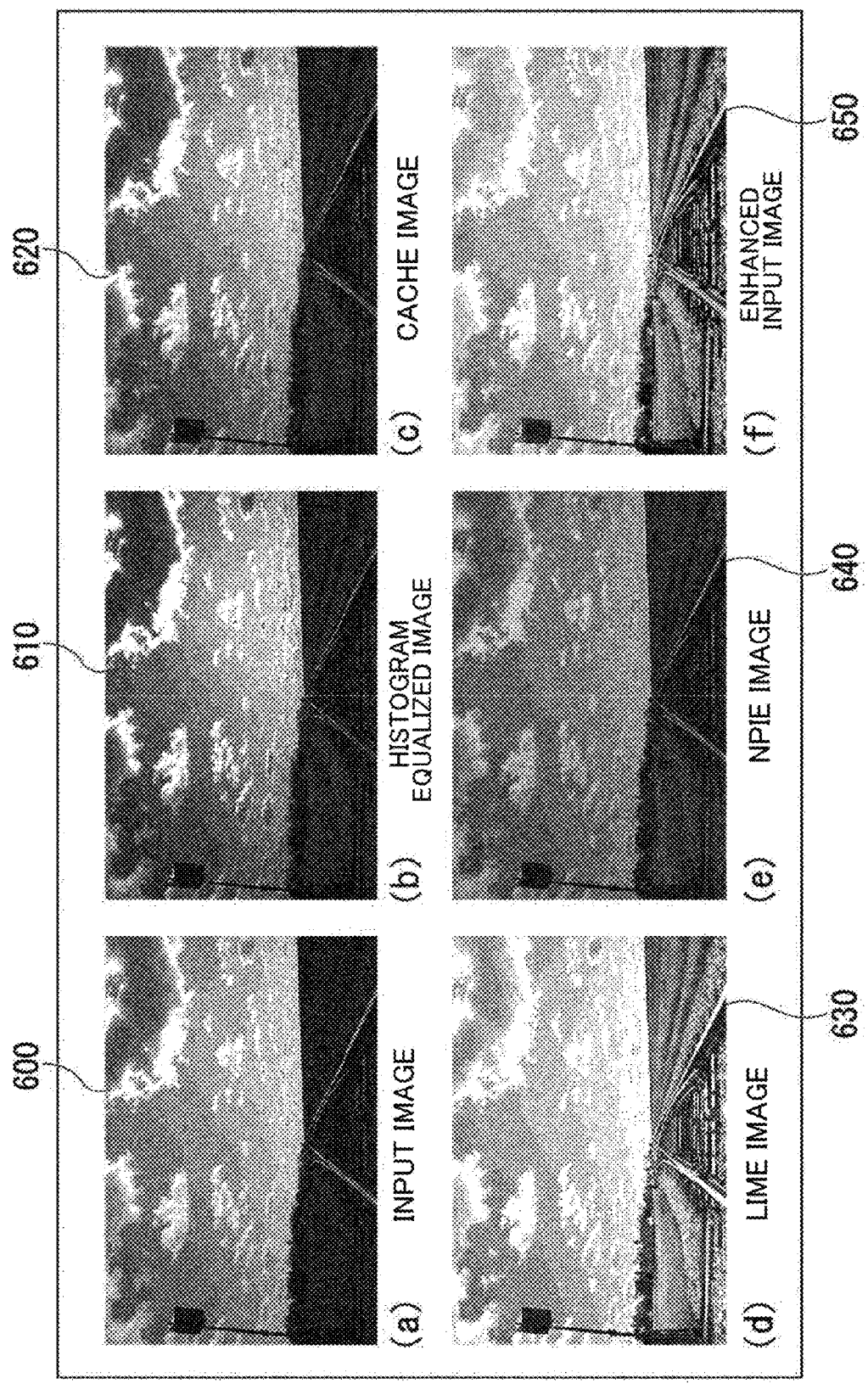
FIG. 12 illustrates a sixth example of a set of an enhanced input image and images obtained by other methods in the embodiment.
Figure 13:
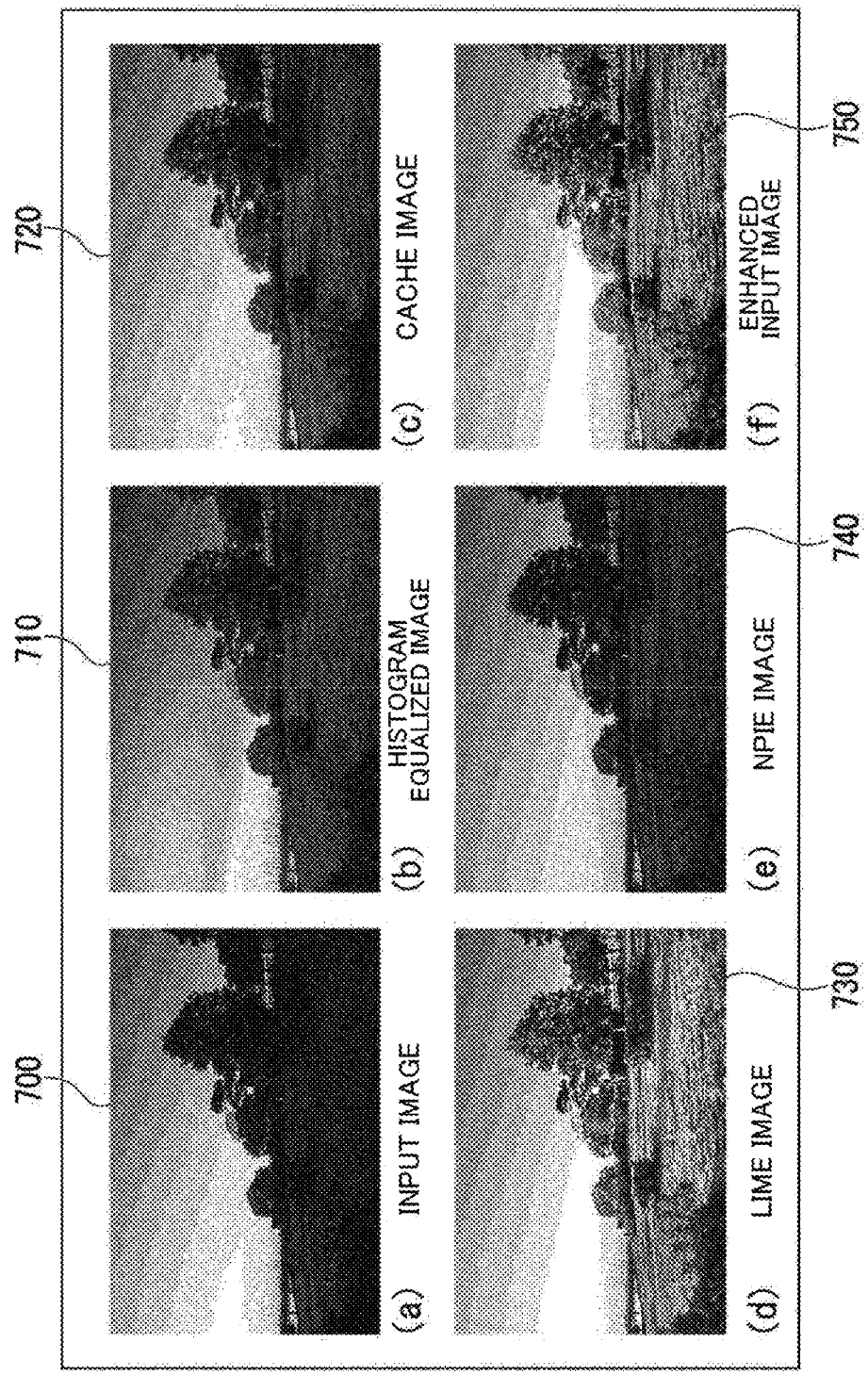
FIG. 13 illustrates a seventh example of a set of an enhanced input image and images obtained by other methods in the embodiment.
Figure 14:
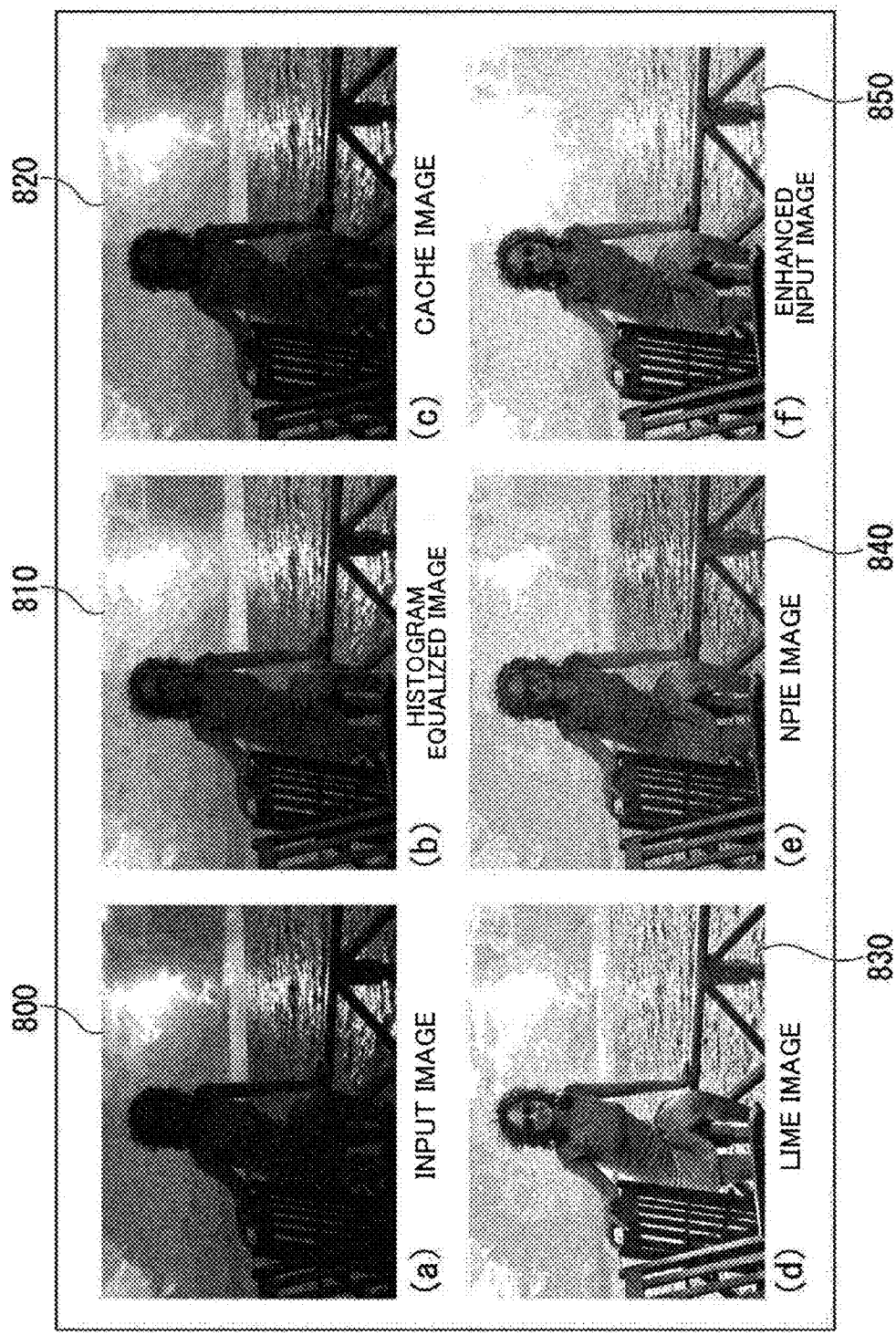
FIG. 14 illustrates an eighth example of a set of an enhanced input image and images obtained by other methods in the embodiment.

FIG. 6 is a diagram illustrating an example of various images. FIG. 6 illustrates an input image 100, an illumination component image 101, a reflectance component image 102, a contrast component 103, a converted grayscale image 104, an enhanced grayscale image 105, a histogram equalized image 110, a CACHE image 120, and a CACHE contrast component 121.

The input image 100 is an example of the input image. The input image 100 includes images of one or more objects (subjects). The images of objects in the input image 100 are, for example, an image of a flower, an image of a bottle, and an image of a painting.

The illumination component image 101 is an example of the illumination component image derived by the grayscale image derivation unit 11. The reflectance component image 102 is an example of the reflectance component image derived by the illumination component derivation unit 12. The contrast component 103 is an example of the image derived by the contrast component derivation unit 14. The contrast component 103 represents the contrast (spatial information) in local dark areas in more detail than the CACHE contrast component 121. The images of visually important areas in the image (the images of the objects) have contrast values of many reflectance components as compared to images of areas that are not visually important (images other than the objects).

The converted grayscale image 104 is an example of the image derived by the luminance conversion unit 17. In the converted grayscale image 104, the brightness of the background is improved as compared with the histogram equalized image 110 and the CACHE image 120. The enhanced grayscale image 105 is an example of the image derived by the reflectance component addition unit 18.

The histogram equalized image 110 is an image representing a result of equalizing the luminance histogram of the input image 100.

The CACHE image 120 is an image generated based on local luminance contrasts (luminance gradients) in the grayscale image (see NPD 1). The CACHE contrast component 121 is an image representing luminance contrasts (luminance gradients) of the CACHE image 120. Despite the abundance of image details in the input image 100, the CACHE contrast component 121 exhibits low luminance gradients in dark areas. As a result of enhancing the contrast of the image based on such luminance gradients, in the CACHE image 120, the brightness of the dark areas and the visibility of the details such as a bouquet are not improved at all. This is because the magnitudes of the local contrast values used as spatial information are significantly reduced by non-uniform illumination (lack of brightness in dark areas).

Various image examples are now presented: an enhanced input image, a histogram equalized image, an image obtained by the method of NPD 1 (CACHE image), an image obtained by the method of NPD 2 (LIME (Low-Light Image Enhancement) image), and an image obtained by the method of NPD 3 (NPIE (Naturalness Preserved Image Enhancement) image).

Each of FIG. 7 to FIG. 14 illustrates an example of a set of an input image, an enhanced input image, a histogram equalized image, and images according to the respective methods of NPDs 1 to 3. In FIG. 7 to FIG. 14, the input image 100 and input images 200, 300, 400, 500, 600, 700, and 800 are illustrated as examples of input images, respectively.

In the histogram equalized image 110 and histogram equalized images 210, 310, 410, 510, 610, 710, and 810, the visibility of the objects in the foreground is reduced, and the contrast of the background area with many pixels is increased. Each histogram equalized image has low discriminating power for visually important areas in the image.

In the CACHE image 120 and CACHE images 220, 320, 420, 520, 620, 720, and 820, the contrast is naturally enhanced, but the brightness in the dark areas and the ability to enhance the local contrasts are limited.

In the LIME image, the reflectance component is assumed to be the ideal output for contrast enhancement, and the illumination component is completely removed from the input image. As a result of completely removing the illumination component from the input image, the brightness is extremely enhanced in each of the LIME image 130 and LIME images 230, 330, 430, 530, 630, 730, and 830. This extreme enhancement causes a loss of contrast in the local areas in each LIME image.

In the NPIE image 140 and NPIE images 240, 340, 440, 540, 640, 740, and 840, the illumination component is estimated through a bright-pass filter. The illumination component is enhanced using histogram equalization, and the enhanced illumination component and the reflectance component are recombined. In addition, due to the nature of the bright-pass, the brightness in each histogram equalized image is insufficient.

In the enhanced input image 150 and enhanced input images 250, 350, 450, 550, 650, 750, and 850, the contrast is well-balanced and naturally improved. In each enhanced input image, the brightness in dark areas where the local contrasts in the input image cannot be easily observed is improved. Further, in each enhanced input image, extreme enhancement of brightness is suppressed according to the illumination component in the input image.

Although the embodiment of the present invention has been described in detail above with reference to the drawings, the specific configuration is not limited to such an embodiment, and includes any designs and the like without departing from the spirit and scope of the present invention.

INDUSTRIAL APPLICABILITY

The present invention is applicable to an image processing device.

REFERENCE SIGNS LIST

1 Image adjustment device
2 Processor
3 Memory
4 Storage device
10 Input unit
11 Grayscale image derivation unit
12 Illumination component derivation unit
13 Reflectance component derivation unit
14 Contrast component derivation unit
15 Histogram derivation unit
16 Conversion function derivation unit
17 Luminance conversion unit
18 Reflectance component addition unit
19 Image reconstruction unit
20 Output unit
100 Input image
101 Illumination component image
102 Reflectance component image
103 Contrast component
104 Converted grayscale image
105 Enhanced grayscale image
110 Histogram equalized image
120 CACHE image
121 CACHE contrast component
150 Enhanced input image
200 Input image
210 Histogram equalized image
220 CACHE image
230 LIME image 240 NPIE image
250 Enhanced input image
300 Input image
310 Histogram equalized image
320 CACHE image
330 LIME image
340 NPIE image
350 Enhanced input image
400 Input image
410 Histogram equalized image
420 CACHE image
430 LIME image
440 NPIE image
450 Enhanced input image
500 Input image
510 Histogram equalized image
520 CACHE image
530 LIME image
540 NPIE image
550 Enhanced input image
600 Input image
610 Histogram equalized image
620 CACHE image
630 LIME image
640 NPIE image
650 Enhanced input image
700 Input image
710 Histogram equalized image
720 CACHE image
730 LIME image
740 NPIE image
750 Enhanced input image
800 Input image
810 Histogram equalized image
820 CACHE image
830 LIME image
840 NPIE image
850 Enhanced input image

The invention claimed is:

1. An image adjustment device comprising:
an illumination component derivator that derives an illumination component of a grayscale image;
a reflectance component derivator that derives a reflectance component image that is a resulting image in which the illumination component is removed from the grayscale image;
a contrast component derivator that derives a contrast component based on a contrast value between a pixel of the reflectance component image and a peripheral area of the pixel;
a histogram derivator that derives a luminance histogram of the grayscale image weighted according to the contrast value for each pixel of the contrast component;
a conversion function derivator that derives a luminance conversion function for converting a luminance such that a luminance histogram of a converted grayscale image in which the grayscale image is converted by the luminance conversion function and a predetermined histogram are matched with or similar to each other; and
a luminance converter that generates the converted grayscale image,
wherein each of the illumination component derivator, the reflectance component derivator, the contrast component derivator, the histogram derivator, the conversion function derivator, and the luminance converter is implemented by:
i) computer executable instructions executed by at least one processor,
ii) at least one circuitry or
iii) a combination of computer executable instructions executed by at least one processor and at least one circuitry.

2. The image adjustment device according to claim 1, further comprising a reflectance component adder that generates an enhanced grayscale image which is a resulting image in which the converted grayscale image and the reflectance component image are synthesized,
wherein each of the reflectance component adder is implemented by:
i) computer executable instructions executed by at least one processor,
ii) at least one circuitry or
iii) a combination of computer executable instructions executed by at least one processor and at least one circuitry.

3. The image adjustment device according to claim 2, further comprising:
a grayscale image derivator that derives the grayscale image from a color image; and
an image reconstructor that converts the enhanced grayscale image into an image having color information based on the color image and the grayscale image,
wherein each of the grayscale image derivator and the image reconstructor is implemented by:
i) computer executable instructions executed by at least one processor,
ii) at least one circuitry or
iii) a combination of computer executable instructions executed by at least one processor and at least one circuitry.

4. The image adjustment device according to claim 1, wherein the predetermined histogram is a histogram of uniformly distributed luminance.

5. An image adjustment method performed by an image adjustment device, the image adjustment method comprising:
deriving an illumination component of a grayscale image;
deriving a reflectance component image that is a resulting image in which the illumination component is removed from the grayscale image;
deriving a contrast component based on a contrast value between a pixel of the reflectance component image and a peripheral area of the pixel;
deriving a luminance histogram of the grayscale image weighted according to the contrast value for each pixel of the contrast component;
deriving a luminance conversion function for converting a luminance such that a luminance histogram of a converted grayscale image in which the grayscale image is converted by the luminance conversion function and a predetermined histogram are matched with or similar to each other; and
generating the converted grayscale image.

6. A non-transitory computer-readable storage medium storing a program for causing a computer to execute processes, the processes comprising:
deriving an illumination component of a grayscale image;
deriving a reflectance component image that is a resulting image in which the illumination component is removed from the grayscale image;
deriving a contrast component based on a contrast value between a pixel of the reflectance component image and a peripheral area of the pixel;

deriving a luminance histogram of the grayscale image weighted according to the contrast value for each pixel of the contrast component;
deriving a luminance conversion function for converting a luminance such that a luminance histogram of a converted grayscale image in which the grayscale image is converted by the luminance conversion function and a predetermined histogram are matched with or similar to each other; and
generating the converted grayscale image.

* * * * *